United States Patent

[11] 3,614,593

| [72] | Inventor | Melvin A. Lace<br>Prospect Heights, Ill. |
|---|---|---|
| [21] | Appl. No. | 34,987 |
| [22] | Filed | May 6, 1970 |
| [45] | Patented | Oct. 19, 1971 |
| [73] | Assignee | Motorola, Inc.<br>Franklin Park, Ill. |

[54] ROTARY TRANSFORMER FOR ALTERNATOR
8 Claims, 1 Drawing Fig.

[52] U.S. Cl. ..................................................... 322/28,
 310/68, 310/72, 322/59, 322/75
[51] Int. Cl. ......................................................... H02p 9/38
[50] Field of Search........................................... 322/28, 59,
 75; 310/68, 68 D, 72

[56] References Cited
UNITED STATES PATENTS
3,522,520  8/1970  Goldman..................... 322/28

Primary Examiner—Gene Z. Rubinson
Attorney—Mueller & Aichele

ABSTRACT: An alternator having a stator winding for applying alternating current voltage to output terminals thereof has a rotor rotatably mounted therein adjacent the stator to induce the alternating current voltage into the stator. A rotary transformer secured to one end of the rotor shaft has a rotary secondary winding and a core thereof in axial alignment with the rotor shaft and includes a single wire connection between the rotary secondary winding and the alternator rotor winding to transfer the excitation voltage induced in the secondary of the rotary transformer into the rotor winding.

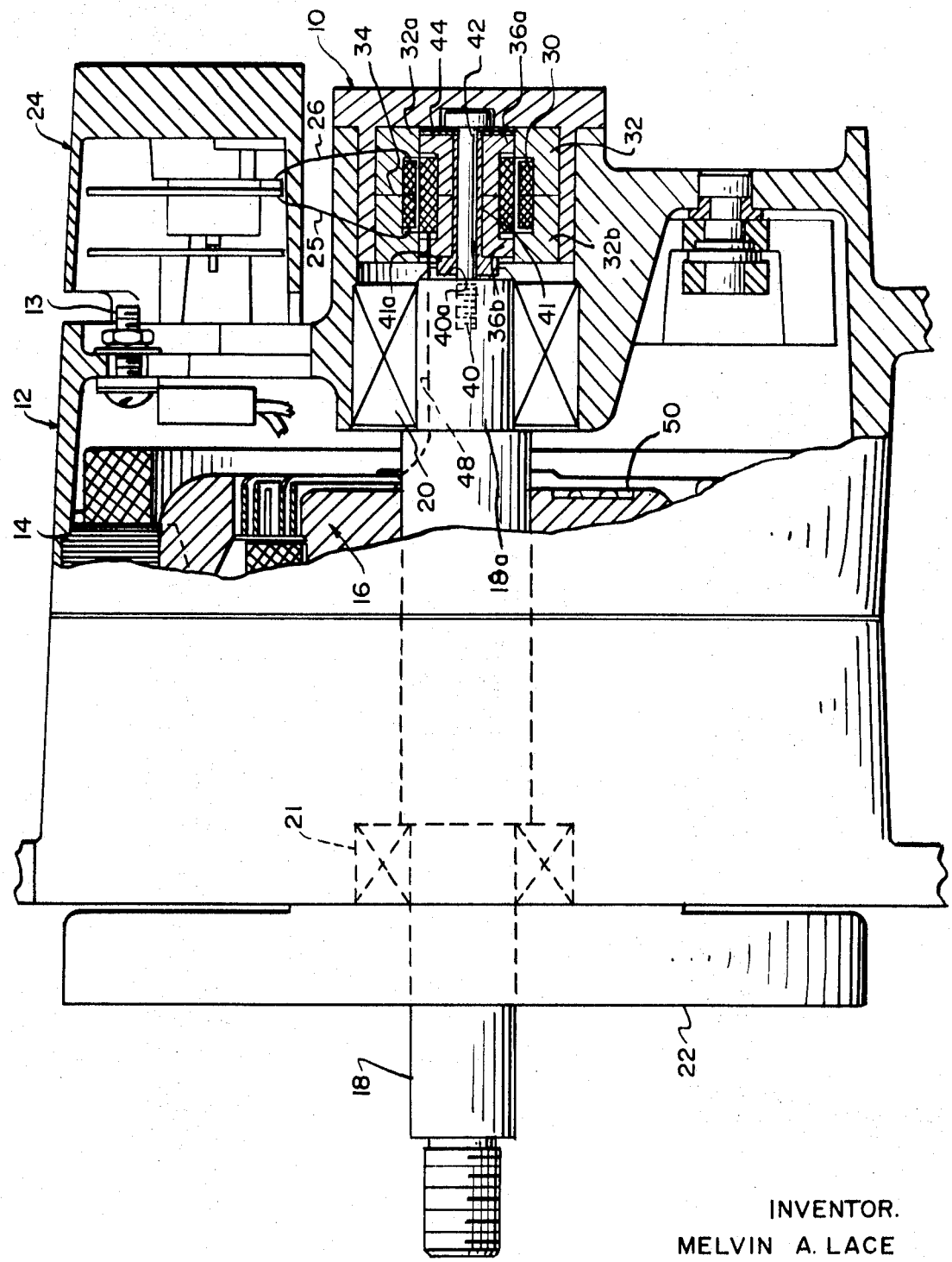
INVENTOR.
MELVIN A. LACE
Mueller & Aichele
BY
ATTORNEYS.

ROTARY TRANSFORMER FOR ALTERNATOR

BACKGROUND OF THE INVENTION

This invention relates generally to dynamoelectric machines, and more particularly to alternators for automotive use to apply an output voltage therefrom to the electrical system of a motor vehicle.

Alternators are well known for the use of supplying electric power to the electrical system of automobiles, trucks and the like. Motor vehicles which travel long distances require equipment which will operate for long periods of time with little or no maintenance. In the past, automotive alternators required the use of slip rings, or the like, to apply a DC, or pulsating DC, voltage to the rotor thereof to effectuate an excitation field in the rotor winding to cause an output voltage to be developed in the stator winding. The requirement of sliprings to apply the DC voltage to the rotor has decreased the effective life of the alternator in that such sliprings tend to wear out before the other components, such as the bearings, or the like.

It has been proposed in the past to eliminate the need for sliprings by using a rotary device having a secondary winding formed on the common shaft of the alternator which receives an excitation signal that is applied via a direct circuit connection, to the rotor of the alternator on the same shaft therewith. The primary winding of the rotary device would receive an excitation signal from a suitable source of alternating current voltage such as, for example, an oscillator or chopper circuit, which may be part of a voltage regulator.

However, such prior art machines were relatively large devices, as for example, those used in mobile equipment such as railroad cars or engines, or other large devices where the rotary transformer could readily be mounted on the same shaft as the rotor of the alternator. When attempting to incorporate the concept of a rotary transformer on an automotive alternator, i.e. of the size generally used in automobiles and trucks, problems occur because of the minimum amount of space allocated to such alternators. Also, the requirement of maintaining a low initial cost and a low maintenance cost for such alternators is important.

To achieve the desired efficiency of the rotary transformer, material such as powdered hydrogen-annealed iron, or the like, is used in the core and pole piece members of the transformer and very close tolerances between the rotatable core and stationary pole piece are required, thus making it necessary to have precise alignment of the rotary pole piece with respect to the axis of the rotor shaft. The powdered hydrogen-annealed iron material may be pressed together with a binder such as epoxy. The advantage obtained by using this type of material is that there are substantially no eddy current losses. Any deviation of this alignment may tend to cause the core to strike against the stationary pole piece resulting in severe permanent damage thereto, particularly in the case where the core is of powdered hydrogen-annealed iron. Generally, alignment can be maintained relatively easily where the rotary transformer portion is formed as an integral part of the rotor shaft; however, this requires that the entire alternator assembly be constructed as a unit and tested as such.

SUMMARY OF THE INVENTION

Accordingly, it is an object of this invention to provide an alternator construction whereby a rotary transformer can be accurately secured to the end of a rotor shaft in axial alignment therewith, thus allowing the alternator unit and the rotary transformer unit to be constructed and tested as two separate subunits, i.e. the alternator proper and the rotary transformer, and then ultimately fasten these components together as a single unit.

Another object of this invention is to provide a highly efficient rotary transformer for use in alternators which are small in size.

Briefly, the alternator of this invention has the rotor shaft thereof machined at one end in a manner to provide means for receiving a support stud and flanged sleeve in substantial concentric, axial alignment with the rotor shaft, and the support stud and flanged sleeve so fastened thereto support a rotary transformer secondary winding which is formed on a core made of compressed powdered hydrogen-annealed iron material. In addition to the stud, adhesives such as epoxy, or the like, may be used to prevent removal of the secondary winding. Also, to ensure that proper axial alignment is achieved, the transformer secondary core and epoxy material may be ground to size after assembly. Preferably, the secondary winding of the rotary transformer is electrically connected to the rotor winding of the alternator through a single wire or conductor, with the rotor shaft itself forming the other wire or conductor, and a diode bridge rectifier circuit is interposed in the single wire to apply a DC voltage to the rotor. By providing alternators as separable units with respect to the rotary transformers, each portion of the alternator can be tested separately and then connected together at a future operation. Also, alternators can be standardized for operation from any voltage value since the excitation of the alternator is controlled by the amount of current applied to the primary winding of the rotary transformer. Hence, the alternator can be designed to operate at a minimum voltage, for example, 6 or 12 volts or so, and with suitable voltage-dropping means connected in circuit with the AC source feeding the rotary transformer with a uniform excitation voltage is obtained. Another, and possibly more desirable approach, would be to make all the rotatable secondary winds the same and change or vary the number of turns in the primary to correspond to the voltage being used.

DESCRIPTION OF THE PREFERRED EMBODIMENT

Referring now to the single FIGURE of the drawings, the essential components necessary for a full and complete understanding of this invention are shown and described in detail with nonessential components illustrated by way of example. A rotary transformer designated generally by reference numeral 10 is formed at one end of an alternator housing 12. The alternator housing 12 includes the usual stator winding 14 for providing an alternating current voltage output at terminals 13 in response to rotation of a rotor 16 supported within the housing 12. The rotor 16 is formed on a shaft 18 journaled at both ends by bearings, such as the bearings 20 and 21. A fan blade 22 is secured to the shaft in the usual manner.

The alternating current voltage output of the stator 14 is applied to the output terminals 13 which, in turn, are connected directly in circuit with a voltage regulator 24 mounted on the exterior portion of the housing 12. However, the voltage regulator 24 may be mounted at any remote location within the motor vehicle using the alternator. The voltage regulator 24 may include oscillator circuit means therein to provide the necessary excitation signal into the rotary transformer via a pair of lines 25 and 26.

Most advantageously, the rotary transformer 10 includes a primary winding 30 formed annularly within a primary magnetic core 32, preferably of powdered hydrogen-annealed iron, and molded in mating halves as indicated by the parting line 34. The primary winding receives the excitation signals from lines 25 and 26 to create a varying magnetic flux field within the core 32. The primary core 32 has radially inwardly turned end portions 32a and 32b of substantial axial extent to be at all times adjacent radially outwardly turned core portions 36a and 36b of a rotary secondary core 36. This feature ensures that a continuous magnet flux path of constant value exists at all times during operation of the rotary transformer 10 regardless of expansion or contraction of the rotary secondary core 36, due to temperature or other things, during operation. The tolerance between the radially outwardly turned portions 36a and 36b and the radially inwardly turned portions 32a and 32b is relatively close, for example, in the order of 0.003 to 0.005 of an inch, more or less. Therefore, it is necessary to maintain the rotary core 36 in substantial axial alignment with the axis of the rotor shaft 18. This is accomplished by providing a threaded aperture or bore 40 at the end of the shaft 18 which has a very accurately machined recess portion or counterbore 40a for receiving the flange 41a of a sleeve 41. The flanged portion 41a of the sleeve 41 is machined perpendicular to the axis thereof to engage the corresponding surface of the recess 40a. The mounting stud 42 has the head thereof engaging a resilient washer means 44 which provides the necessary compliance or resilience for the expansion and contraction of the powdered hydrogen-annealed iron core 36.

The core 36 is provided with a secondary winding 46 which has one end thereof electrically connected via a single insulated wire 48 which passes through a groove formed in the shaft 18 and is in direct circuit connections with the rotary winding of the rotor 16. The other lead of the secondary winding 46 is formed by the powdered hydrogen-annealed iron core 36, the sleeve 41, the support stud 42 and the rotary shaft 18 as a continuous conductive path therethrough. The lead 48 preferably is connected to one terminal of a bridge circuit network, indicated by reference numeral 50, imbedded within the rotor 16 for rotation therewith. This bridge network converts the alternating current voltage induced into the secondary winding 46 of the rotary transformer 10 into a direct current voltage for excitation of the rotor 16 to effect an alternating current output at the stator winding 14. After the winding portion of the rotary transformer 10 has been assembled on the rotor shaft 18, with the windings 46 being well below the radially extended portions 36a and 36b, the transformer secondary assembly can be ground to an exact size to ensure axial alignment. This operation would grind only the powdered hydrogen-annealed iron of the core and any epoxy which may extend beyond the desired diameter.

Preferably, the diameter of the secondary core 36 is slightly less than the diameter of the end portion 18a of the shaft 18 which is supported by the bearing 20 and therefore, should removal of the bearing 20 become necessary, it can be slipped over the secondary core 36 without removing the same from the shaft.

Accordingly, what has been described is a simple and effective means for providing a rotary transformer at the end of a rotor shaft of an alternator. Therefore, variations and modifications of this invention may be effected without departing from the spirit and scope of the novel concepts disclosed and claimed herein.

I claim:

1. An alternator comprising, in combination:
a support means;
a stator winding secured to said support means and arranged for applying an alternating current voltage to output terminals of the alternator;
a shaft rotatably mounted at axially spaced-apart support bearings held by said support means;
a rotor winding formed on the said shaft between said axially spaced-apart support bearings and arranged to induce an alternating current voltage into said stator winding when rotating relative thereto;
an excitation means secured to said support means outwardly of one of said axially spaced-apart support bearings and arranged for receiving directly an excitation signal;
a support stud;
means formed at one end of said shaft to receive said support stud in substantial concentric axial alignment with said shaft and in a spaced relation to said excitation means;
inductance means carried by said support stud to be in a close running fit with said excitation means inductively to receive said excitation signal; and
means connecting said inductive means with said rotor winding to apply the excitation signal so received to said rotor winding to cause a magnetic field therein and induce an alternating current voltage output at said stator winding.

2. The alternator of claim 1 wherein said excitation winding includes a cylindrical magnetic pole piece having radially inwardly turned ends axially extending a given distance, an excitation winding formed on said pole piece between said radially inwardly turned ends, and said inductance means carried by said support stud includes a magnetic core member axially positioned within the cylindrical magnetic pole piece and held by said support stud, and having radially outwardly turned ends in close proximity with the radially inwardly turned ends of said magnetic pole piece, and an inductance winding on said magnetic core between its ends and connected in circuit with said rotor winding.

3. The alternator of claim 2 wherein said magnetic core member has radially outwardly turned ends which extend axially a distance less than the given distance of the radially inwardly turned ends of said magnetic pole piece to be at all times in magnetic flux registry therewith.

4. The alternator of claim 1 wherein said inductance means includes a magnetic core member axially held in position at the end of said shaft by said support stud, said magnetic core member having a diameter less than the diameter of said shaft to allow removal of the bearing means at that end of said shaft without removal of said magnetic core member.

5. The alternator of claim 1 wherein said means formed at one end of said shaft is a recess having a smooth wall portion extending perpendicular to the axis of said shaft, and further including a flanged sleeve through which said support stud passes, the flange portion thereof being perpendicular to the axis of said shaft and engaged with said recess to ensure axial alignment of said inductance means with said shaft.

6. The alternator of claim 1 wherein said inductance means includes a core member of powdered hydrogen annealed iron having an axial aperture for receiving said support stud, and said support stud has a threaded portion formed at one end thereof to engage the end of said shaft and a head formed at the other end thereof to apply pressure to said core member to hold the same in position, and a resilient washer interposed between said core member and said head of said support stud to compensate for expansion and contraction of said core member.

7. The alternator of claim 1 wherein said inductance means includes a winding which has one end thereof connected to the rotor winding of said alternator through a single wire and the other end thereof electrically connected through said shaft to effect a second connection to the rotor winding of the alternator.

8. The alternator of claim 1 wherein said excitation means and said inductance means include closely spaced core members formed of powdered hydrogen annealed iron.